April 17, 1962 R. J. MYOTTE 3,029,930
DRAWBENCH
Filed March 31, 1959 7 Sheets-Sheet 1
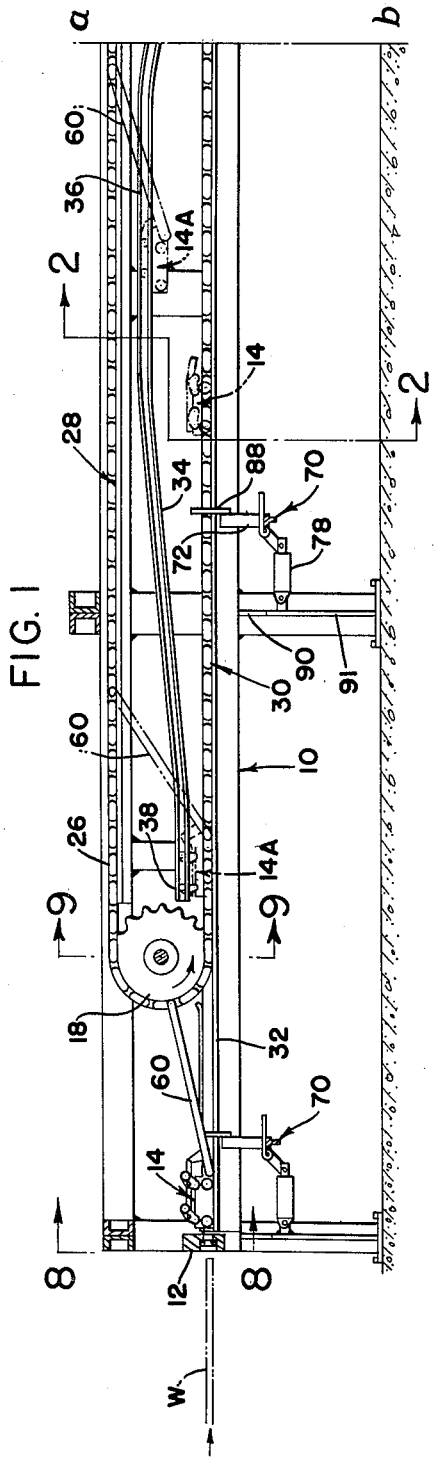
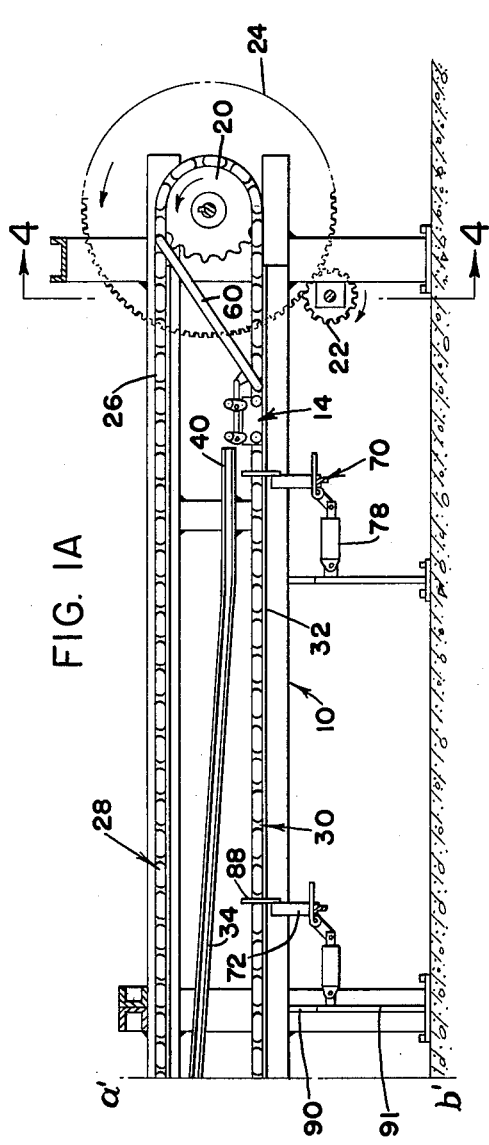
INVENTOR.
ROBERT J. MYOTTE
BY
Williams, Tilbury & Tobrick
ATTORNEYS April 17, 1962 R. J. MYOTTE 3,029,930
DRAWBENCH
Filed March 31, 1959 7 Sheets-Sheet 2

INVENTOR.
ROBERT J. MYOTTE
BY
Williams, Tilbury & Tobrick
ATTORNEYS

April 17, 1962 — R. J. MYOTTE — 3,029,930
DRAWBENCH

Filed March 31, 1959 — 7 Sheets-Sheet 3

INVENTOR.
ROBERT J. MYOTTE
BY Williams, Tilbury & Jobrick
ATTORNEYS

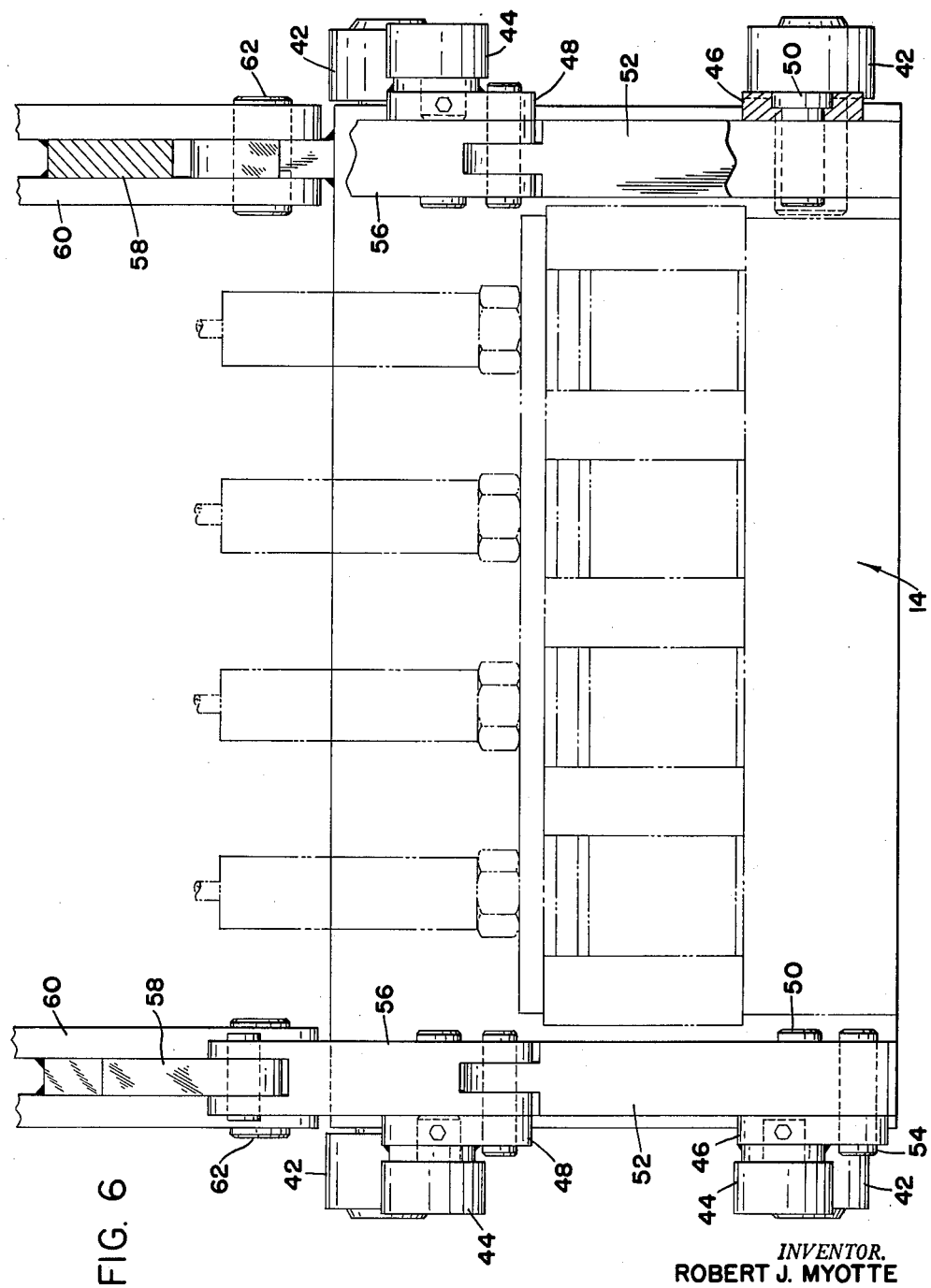

April 17, 1962 R. J. MYOTTE 3,029,930
DRAWBENCH
Filed March 31, 1959 7 Sheets-Sheet 5
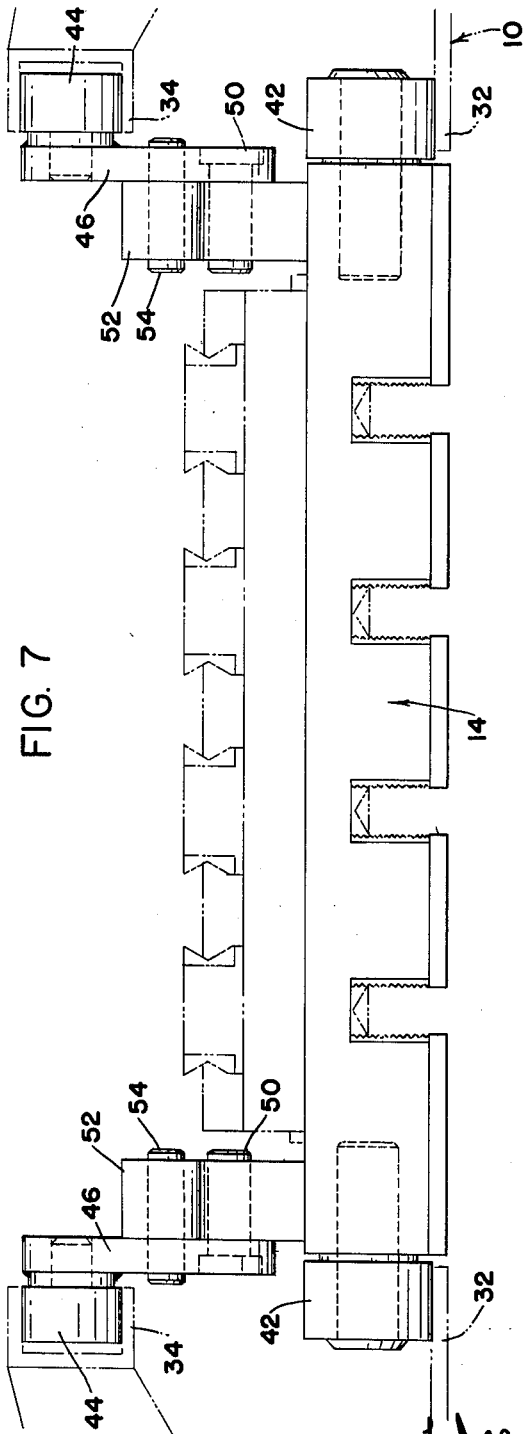
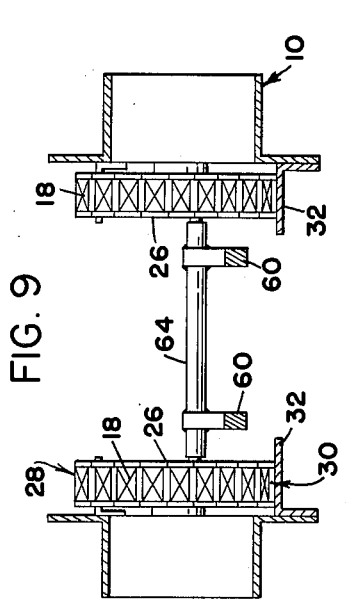
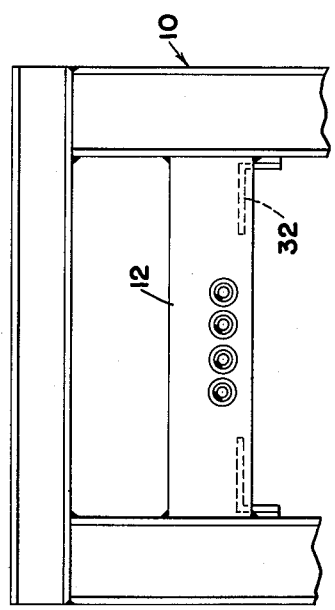
INVENTOR.
ROBERT J. MYOTTE
BY
Williams, Tilbury & Johrick
ATTORNEYS April 17, 1962  R. J. MYOTTE  3,029,930
DRAWBENCH Filed March 31, 1959  7 Sheets-Sheet 6

INVENTOR.
ROBERT J. MYOTTE
BY
Williams, Tilbury & Jolrick
ATTORNEYS

April 17, 1962     R. J. MYOTTE     3,029,930
DRAWBENCH
Filed March 31, 1959     7 Sheets-Sheet 7
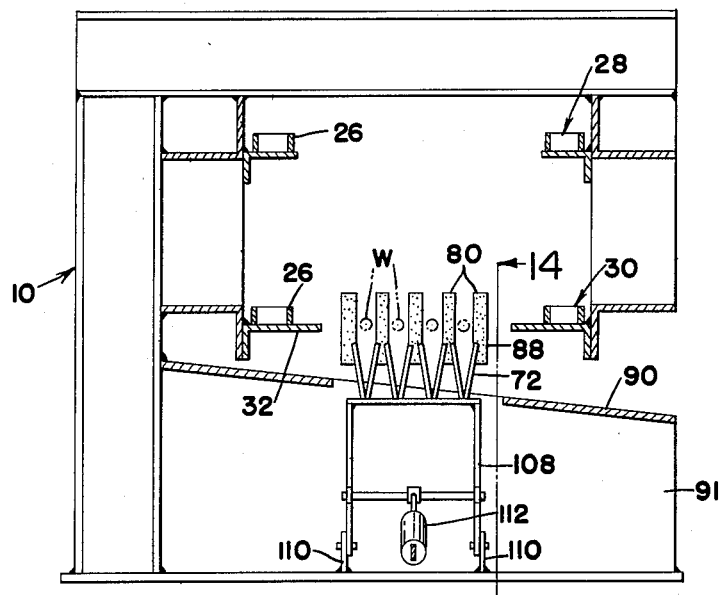
FIG. 13
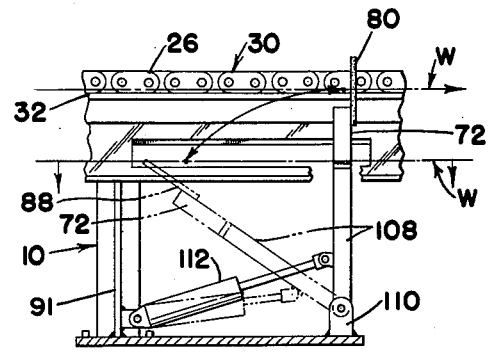
FIG. 12     FIG. 14
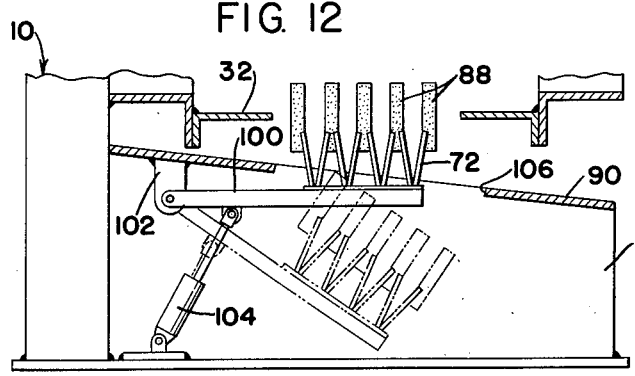
INVENTOR.
ROBERT J. MYOTTE
BY
ATTORNEYS United States Patent Office 3,029,930
Patented Apr. 17, 1962

3,029,930
DRAWBENCH
Robert J. Myotte, 19431 Ormiston Ave., Euclid, Ohio
Filed Mar. 31, 1959, Ser. No. 803,295
7 Claims. (Cl. 205—3)

This invention relates to drawbenches, and in particular to improvements in means for traversing a drawbench carriage to and from the diestand end of the drawbench.

In order to render drawbenches more efficient, it has been proposed heretofore to employ two carriages in such relationship that as a first carriage is drawing stock through the diestand, a second carriage is returning toward the diestand so as to be positioned in readiness to draw stock as soon as the first drawing operation is completed. This arrangement of two carriages eliminates re-traversing time loss which is inherent in one carriage-type drawbenches. Many proposals have been advanced for traversing a pair of carriages in opposite directions in such a manner as to avoid interference one with the other. Thus, it has been proposed to station elevators at opposite ends of the drawbench to transport a carriage from one level of travel to a second level of travel; various complex track shifting arrangements have also been suggested; and many other arrangements are disclosed in the prior art, all of which are objectionable among other reasons because of the complexity of their structures.

It is, therefore, an object of this invention to provide a drawbench having improved and novel means for traversing a pair of drawbench carriages in opposite directions during a drawing cycle of operation; to provide a drawbench having a simple track system for supporting and traversing a drawbench carriage to and from the diestand; the provision of a drawbench having a simple but efficient anti-recoil means for intercepting drawn stock and preventing whiplashing which sometimes occurs when the tension in drawn stock is suddenly released at the end of its drawing cycle; and the provision of a drawbench having a drawbench carriage of novel construction adapted to co-act with a novel track system for providing the traversing of a pair of drawbench carriages in opposite directions during a drawing cycle of operation.

The features of this invention which are believed to be novel are set forth with particularity in the appended claims. The invention itself, however, both as to its organization and use, together with further objects and advantages thereof, may best be understood by reference to the following description taken in conjunction with the accompanying drawings in which:

FIGURES 1 and 1A comprise a single schematic side elevational view of a preferred embodiment of the invention;

FIGURE 6 is a plan view of the drawbench carriage shown in FIGURE 5;

FIGURE 7 is an end elevational view of the drawbench carriage shown in FIGURE 5;

FIGURE 8 is a fragmentary sectional view in elevation taken on the line 8—8 of FIGURE 1;

FIGURE 9 is a fragmentary sectional view in elevation taken on the line 9—9 of FIGURE 1;

FIGURE 12 is a fragmentary sectional elevational view of another arrangement of the anti-recoil device shown in FIGURE 11;

FIGURE 13 is a sectional elevational view of yet another arrangement of the anti-recoil device shown in FIGURE 11; and, FIGURE 14 is a side elevational view of the anti-recoil device shown in FIGURE 13 taken on line 14—14.

Figure 4:
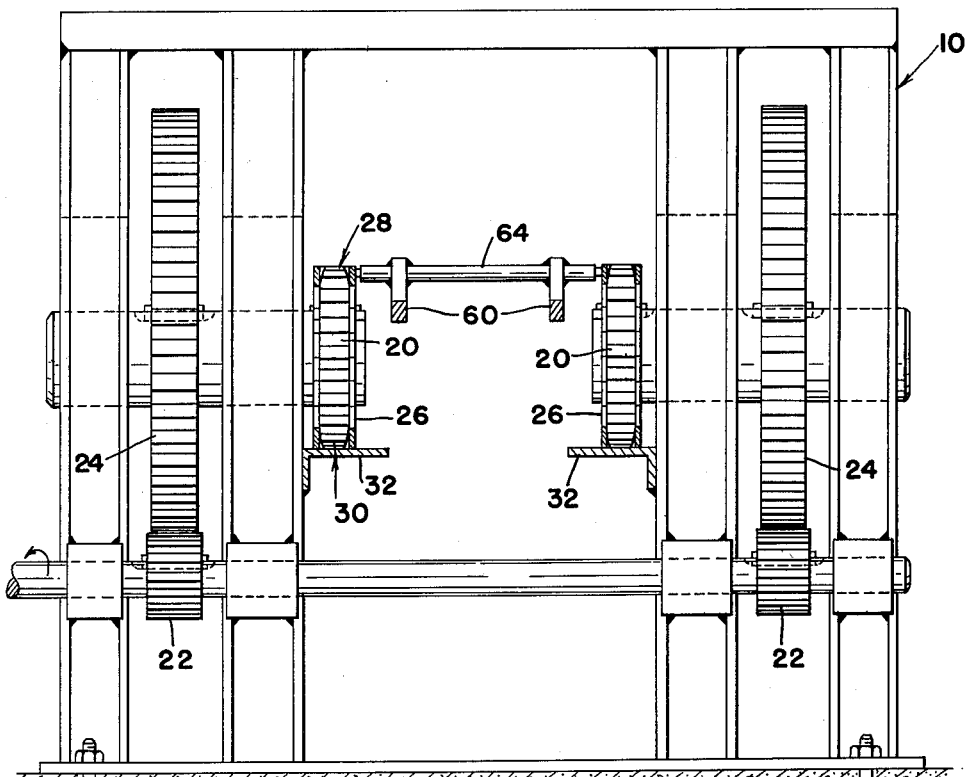
FIGURE 4 is an enlarged sectional view taken on the line 4—4 of FIGURE 1A.

Reference will now be made to the figures in greater detail and at the outset to FIGURES 1 and 1A in particular. The general organization of the drawbench includes a supporting frame 10, having a die 12 secured at one end into which workstock W is positioned prior to being engaged by a drawbench carriage 14. Drawbench carriage 14 traverses the length of the drawbench as delimited by the drawbench chains 26 and draws the stock W through the die 12 in order to provide the necessary reduction in the original size of the stock, all of which is old and well understood by those versed in the prior art. Also mounted on the drawbench frame 10 are pairs of driven idler sprockets 18 and drive sprockets 20 (see also FIGURE 9), sprockets 18 being mounted for rotation in a vertical plane at the left end of the drawbench frame shown in FIGURE 1, but inboard of the die sufficient to provide space for the length of a carriage and a carriage connecting rod, as will be described more fully hereinafter. Sprockets 20 (see also FIGURE 4) are mounted for rotation in a vertical plane at the extreme right end of the drawbench frame as shown in FIGURE 1A, and are driven by pinions 22 and bull gears 24. The sprocket members 18 and 20 support the aforesaid pair of drawchains 26 for rotation in vertical planes to comprise upper and lower flights 28 and 30.

Figure 2:
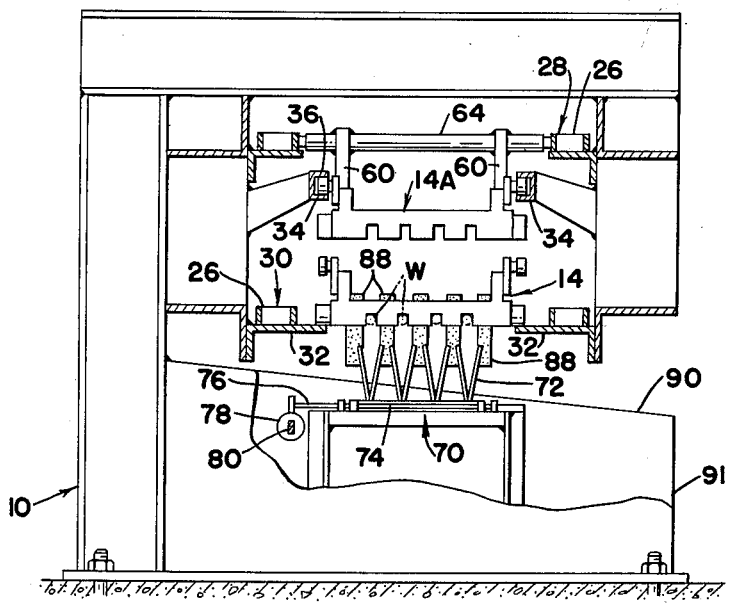
FIGURE 2 is an enlarged fragmentary and elevation taken on the line 2—2 of FIGURE 1.

A first or lower set of tracks 32 (see FIGURE 2) is supported along horizontal frame portion 10 to provide traverse means for carriages 14 and 14A on the level of the drawbench die 12 and substantially along the entire length of the drawbench. A second or upper set of tracks 34 is positioned inboard of the sprockets 18 and 20 as shown in FIGURES 1 and 1A, and is of arcuate configuration. The mid-portion 36 of the tracks being arcuately remote from the first or lower tracks 32. The curvature of the upper set of tracks at its mid-portion is such that a pair of carriages 14 and 14A, one being traversed on the lower tracks and the second being traversed in the opposite direction on the upper tracks, will not interfere one with the other. It will be noted that the opposite ends 38 and 40 of the upper set of tracks 34 are also spaced vertically apart from the lower tracks 32 sufficient to permit a carriage to pass therebeneath.

Figure 5:
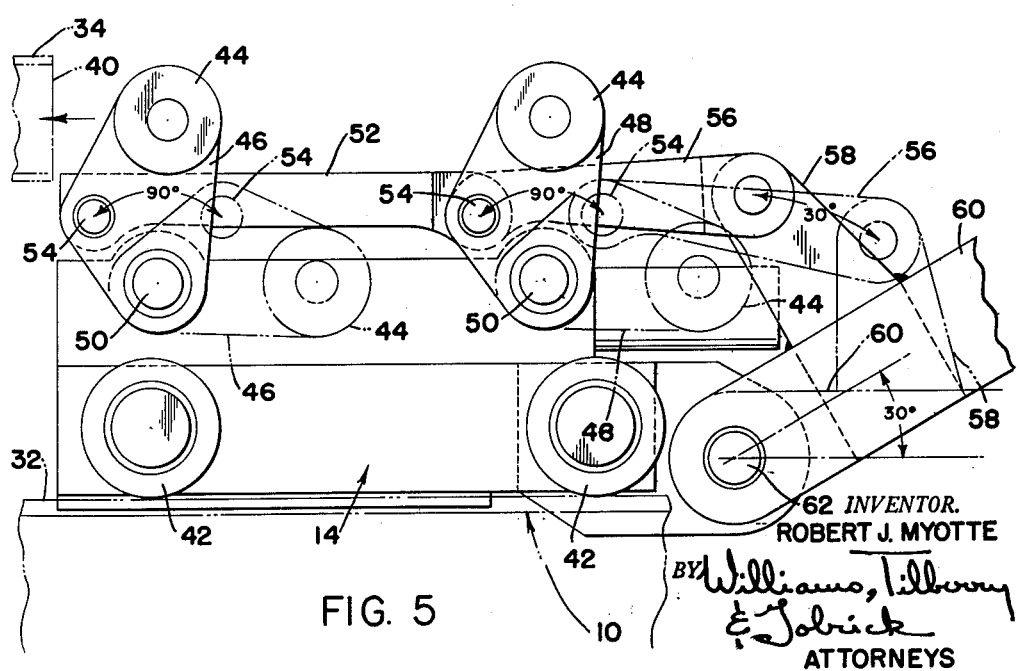
FIGURE 5 is an enlarged side elevation view of a preferred embodiment of the drawbench carriage.

Referring now to FIGURES 5, 6, and 7, it will be observed that the drawbench carriage 14 includes a first or lower set of wheels 42 adapted to support the carriage to run on the first or lower set of tracks 32. Additionally, a second or upper set of wheels 44 is also provided, and is pivotally secured to the carriage on pairs of wheel bracket members 46 and 48. The wheel bracket members 46 and 48 are pivotally secured to the carriage 14 on pins 50 and are interconnected one pair to the other by connecting links 52 secured thereto by pins 54. A second pair of links 56 is pivotally secured at opposite ends to the first pair of links 52 and to a pair of lever arms 58 respectively. The pair of lever arms 58 is rigidly secured to a pair of connecting rods 60 pivotally secured to opposite sides of the carriage 14 by pins 62 and to the drawchains 26 by means of a drawchain cross-rod 64 (see FIGURE 2).

The upper wheels 44 are shown in FIGURE 5 in two positions, i.e., raised and lowered, their position depending on the angularity of the connecting rods 60. Thus, assuming the direction of rotation of the drawchains 26 to be as indicated by the arrow on sprocket 18 in FIGURE 1, then as the carriage is drawn from left to right, the connecting rods 60 will be substantially horizontal, and levers 58 in association with connecting links 52 and 56 will maintain the upper wheels 44 on brackets 46 and 48 in a lowered position as shown by the phantom outline in FIGURE 5. In this position, the carriage overall height is reduced sufficiently to pass beneath upper track ends 38 and 40. However, as the carriage reaches the right end of the drawbench as shown in FIGURE 1A, the ends of the connecting rods 60 connected to the drawchains 26 are inclined upwardly causing the upper wheels 44 of the carriage 14 to be projected into an upstanding position sufficient to engage the ends 40 of upper tracks 34. Tracks 34 then guide the carriage 14 upwardly above the lower tracks 30 until, at the mid-point 36 of the tracks 34, sufficient clearance is gained to permit a second carriage to pass therebeneath moving from left to right as the upper carriage moves from right to left. In this manner, a pair of carriages 14 and 14A can be continuously in operation without interfering one with the other, and by means which are simple, and reliable.

Figure 3:
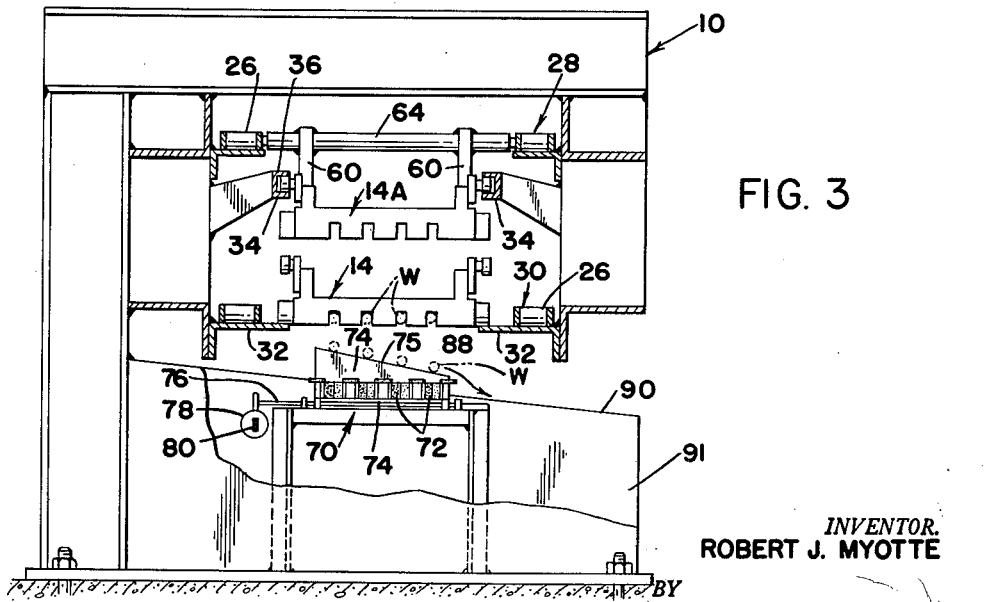
FIGURE 3 is an enlarged fragmentary sectional view similar to FIGURE 2, but with anti-recoil means revolved 90°.
Figure 10:
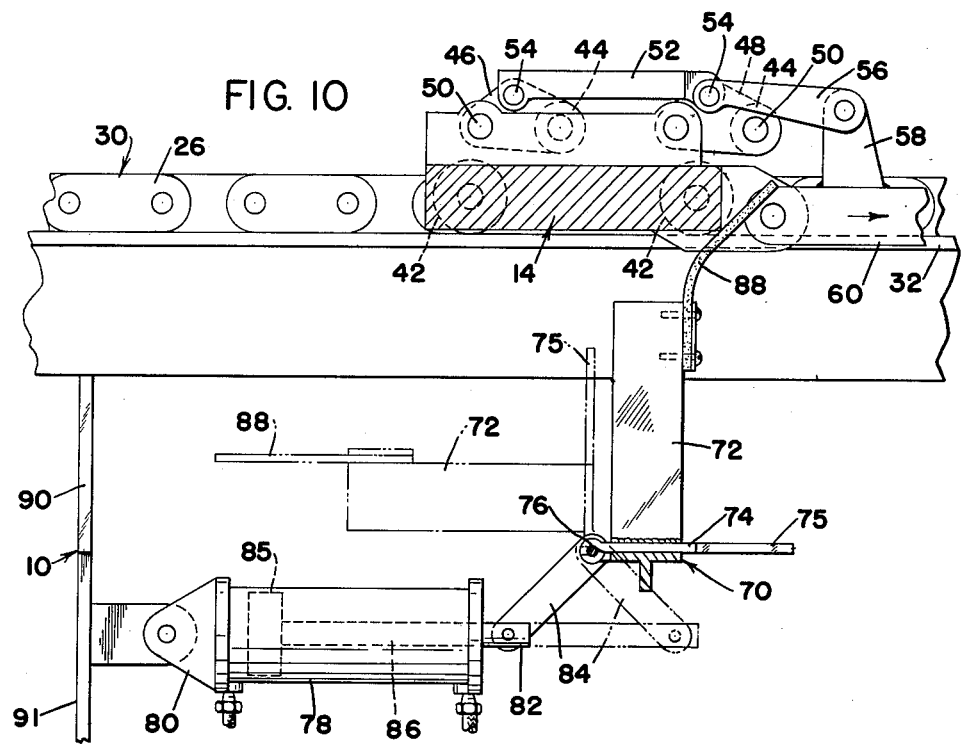
FIGURE 10 is a fragmentary sectional view in elevation showing a resilient anti-recoil member in contact with the drawbench carriage.
Figure 11:
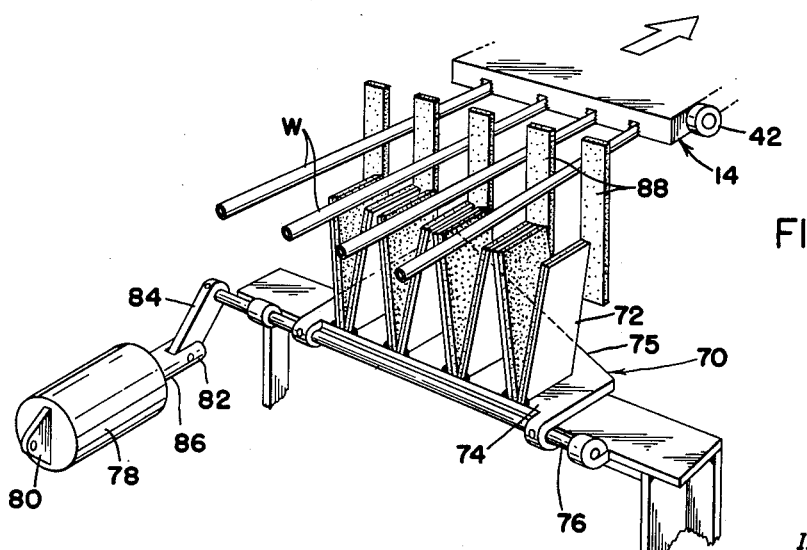
FIGURE 11 is a schematic perspective view of one of a plurality of anti-recoil devices stationed beneath the drawbench to intercept drawn workstock and to prevent re-coil thereof.

As the carriage 14 reaches the end of its traverse shown in FIGURE 1A, the workstock gripping means release the workstock at the same time that the opposite ends of the workstock are released from the die 12. The means for gripping and releasing workstock associated with the carriage 14 and die 12 is old and does not therefore constitute a portion of this invention. However, experience has taught that the sudden release of tension in drawn workstock sometimes results in whiplashing of the stock which is difficult to control and sometimes results in spoiled stock and damaged equipment. To alleviate this condition, anti-recoil devices 70 are stationed beneath the frame 10 as is shown more clearly in FIGURES 2, 3, and 9. At spaced intervals along the underside of the drawbench, V-shaped stock intercepting means 72 are supported on an ejector plate 74 and pivotally secured to the frame on rod 76. A fluid motor 78 is secured at one end 80 to the frame 10 and at the opposite end 82 to a lever arm 84 rigidly secured to the cross rod 76. When the fluid motor is energized, its piston 86 pivots the lever arm 84 causing the V-shaped workstock intercepting means 72 to rotate forwardly 90° as shown in phantom in FIGURE 10. The intercepting means 72 remain in the vertical position while the stock is being drawn, and to guide the stock into the intercepting means at the completion of the draw, guide members 88 are secured to the V-members 72 to provide positive direction of the stock downwardly into the V-receptacles. The workstock guide members 88 are resilient and project upwardly into the path of the carriage 14 and are deflected downwardly as the carriage passes thereover. After the stock W drops into the V-receptacles 72, the fluid motors 78 are then energized to pivot the receptacles counter-clockwise 90° as seen in FIGURE 10. This movement of receptacles 72 in combination with ejector plate 74 ejects the stock from receptacles 72 after it has been brought to rest whereinafter the stock will roll along the inclined edge 75 of ejector plate 74 and then onto the sloping surface 90 of table 91 (see FIGURE 3) to one side of the drawbench.

While the invention shown and described is illustrative of a typical embodiment thereof, it will become evident that the invention is susceptible of other forms, and that the typical embodiment shown herein is by way of example only and is not to be construed in a limiting sense. For instance, it is contemplated that the relative track positions may be reversed whereby the returning carriage passes beneath instead of above the work drawing carriage as shown. Other anti-recoil shifting means are also contemplated. For instance, as shown in FIGURE 12, a set of V-shaped crotches 72 are mounted on a supporting arm 100 pivotally secured to a frame member 102, and actuated by an air cylinder 104. A suitable slot 106 is provided in the table surface 90 of the inclined table 91 to permit the crotches to be pivoted below the table surface 90 whereby the workstock will be intercepted by the table surface and carried to one side of the drawbench.

Yet another arrangement for ejecting stock from the V-shaped crotches 72 is illustrated in FIGURES 13 and 14. In this embodiment of the stock ejecting means, the V-shaped crotches are supported on an upstanding carrier bracket 108 pivotally secured to base member lugs 110 of the frame 10. An air cylinder 112 pivots the carrier longitudinally with respect to the drawbench as opposed to the transverse pivotal movement illustrated in FIGURE 12. In this embodiment, longitudinal slots must be provided in the table surface 90 so as to enable the crotch members to clear the surface of the table.

The advantage of the embodiment shown in FIGURE 12 resides in the fact that less clearance space is necessary in the table surface 90 to provide for movement of the V-crotch members above and below the surface table than required by the longitudinally moving V-crotch members in FIGURES 13 and 14.

The advantage of the device illustrated in FIGURES 13 and 14 resides in the fact that certain compensating positioning of the stock is provided by longitudinal movement of the crotches. Otherwise stated, due to the momentum of the forward motion of the stock as it leaves the die, the stock will continue to travel forwardly up to ten feet depending, of course, on the length of the stock, its initial speed, its mass, and all of the other usual considerations. However, this forward motion may, in certain circumstances, be sufficient to project the forward end of the stock into a position which would present problems of interference in getting the stock to roll to one side of the drawbench, for instance, an upstanding frame supporting leg or the like may interfere with the forward end of the stock. With the device shown in FIGURES 13 and 14, pivotally moving the V-crotches from right to left as oriented with respect to the drawbench as shown in the figures, would tend to reshift the stock rearwardly so as to clear any potential obstructions which the front end of the stock may have encountered.

Yet another embodiment contemplates a combination of the arrangements shown in FIGURES 12, 13, and 14 wherein certain of the V-crotches would be mounted for transverse pivotal movement, and other V-crotch members would be mounted for longitudinal pivotal movement, thus combining the advantages of both arrangements.

Still other arrangements and modifications will occur to those skilled in the art upon a reading of this specification taken in conjunction with the drawings, and other arrangements may be resorted to without departing from the spirit and scope of the invention.

I claim:
1. In a drawbench of the class described including a carriage, endless drawchain means having longitudinally extending upper and lower flights, means to continuously rotate said drawchain means uni-directionally, and track means to support said carriage, the improvement comprising: a first track extending longitudinally adjacent to and in the same horizontal plane as one of said drawchain flights; a second longitudinally extending track positioned between said drawchain upper and lower flights; a first set of wheels journaled on said carriage and adapted to engage said first track; a second set of wheels journaled on said carriage and vertically shiftable to engage said second track; and means to vertically shift said second set of wheels responsive to the position of said carriage relative to said drawchain means.

2. In a drawbench of the class described including a carriage, endless drawchain means having longitudinally extending upper and lower flights, means to continuously rotate said drawchain uni-directionally, and track means to support said carriage, the improvement comprising: a first track extending longitudinally adjacent to and in the same horizontal plane as one of said drawchain flights; a second longitudinally extending track vertically positioned between said drawchain upper and lower flights, said second track being arcuately shaped with its opposite ends adjacent said one of said flights and with its mid-section remote from said one of said flights; a first set of wheels journaled on said carriage and adapted to support said carriage on said first track; a second set of wheels journaled on said carriage and vertically shiftable to engage said second track; and means to vertically shift said second set of wheels responsive to the position of said carriage relative to said drawchain.

3. In a drawbench of the class described including a carriage, longitudinally extending endless drawchain means having upper and lower flights rotatable in a vertical plane, and track means to support said carriage, the improvement comprising: a first track extending adjacent to and in the same horizontal plane as the lower of said drawchain flights; a second track vertically positioned and longitudinally extending between said drawchain upper and lower flights, said second track being arcuately shaped with its opposite ends inboard of the ends of said first track, and with its mid-section arcuately remote from said first track; a first set of wheels journaled on said carriage adapted to support said carriage on said first track; a second set of wheels journaled on said carriage and vertically shiftable to engage said second track; pivotal connecting rod means between said carriage and said drawchain; and second wheel set shifting means connected between said pivotal connecting rod means and said second set of wheels adapted to shift said second set of wheels responsive to pivotal movement of said connecting rod means.

4. The drawbench set forth in claim 3, wherein said second set of wheels are journaled on bracket means pivotally secured to said carriage; and connecting link means between said bracket means and said connecting rod means responsive to pivotal movement of said connecting rod means to shift said bracket means.

5. In a drawbench of the class described including a drawbench frame, a carriage, endless drawchain means having upper and lower flights, and track means to support said carriage, the improvement comprising: a first track extending adjacent to and in the same horizontal plane as one of said drawchain flights; a second track positioned between said drawchain upper and lower flights, said second track being arcuately shaped with its opposite ends inboard of the ends of said first track, and with its mid-section remote from said first track; first set of wheels journaled on said carriage and adapted to support said carriage on said first track; bracket means pivotally secured to said carriage; a second set of wheels journaled on said bracket means; connecting rod means pivotally secured between said carriage and said drawchain means; and connecting link means pivotally secured between said bracket and said connecting rod means, said connecting link means being adapted to pivot said bracket responsive to pivotal movement of said connecting rod means.

6. The drawbench set forth in claim 5, wherein said bracket means comprises: pairs of arms pivotally secured to opposite sides of said carriage; drag link means pivotally interconnecting said pairs of arms; and toggle-connecting link means between said drag link means and said connecting rod means.

7. In a drawbench of the class described, including a drawbench frame, a carriage, longitudinally extending endless drawchain means having upper and lower flights adapted to rotate continuously in one direction, sprocket means supporting said drawchain means at opposite ends thereof, and track means to support said carriage, the improvement comprising: a first track longitudinally extending adjacent to and in the same horizontal plane as the lower of said draw chain flights; a second longitudinally extending track positioned between said drawchain upper and lower flights, said second track being arcuately shaped with its opposite ends inboard of the ends of said first track, and spaced to provide carriage clearance between said tracks; a first set of wheels journaled on said carriage and adapted to support said carriage on said first track; bracket means pivotally secured to said carriage; a second set of wheels journaled on said bracket means; connecting rod means pivotally secured between said carriage and said drawchain means; and connecting link means pivotally secured between said bracket and said connecting rod means, said connecting rod means being adapted to pivot said bracket vertically in the direction of pivotal movement of said connecting rod as it is carried respectively about the periphery of each sprocket means by said draw chain means, whereby said second set of wheels are pivoted into engagement with one end of said second track, and are adapted to be pivoted out of engagement with said second track at the opposite end thereof.

References Cited in the file of this patent

UNITED STATES PATENTS

| | | |
|---|---|---|
| 977,119 | Mitchell | Nov. 29, 1910 |
| 1,416,589 | Wallace | May 16, 1922 |
| 1,672,092 | Russell | June 5, 1928 |
| 2,320,739 | Knudsen et al. | June 1, 1943 |
| 2,391,908 | Knudsen et al. | Jan. 1, 1946 |
| 2,596,340 | Mahns | Mar. 13, 1952 |
| 2,630,910 | Turner | Mar. 10, 1953 |
| 2,781,002 | Talboys | Feb. 12, 1957 |
| 2,837,206 | McIlvried | June 3, 1958 |
| 2,873,849 | Lombard | Feb. 7, 1959 |